United States Patent
Paso et al.

(10) Patent No.: US 10,742,260 B2
(45) Date of Patent: Aug. 11, 2020

(54) SYNCHRONIZING UNICAST TRAFFIC

(71) Applicant: Arm Limited, Cambridge (GB)

(72) Inventors: Jarkko Paso, Oulu (FI); Mika Antero Tervonen, Oulu (FI)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/529,027

(22) Filed: Aug. 1, 2019

(65) Prior Publication Data
US 2020/0044689 A1 Feb. 6, 2020

(30) Foreign Application Priority Data
Aug. 3, 2018 (GB) .................................. 1812699.5

(51) Int. Cl.
*H04B 1/7156* (2011.01)
*H04W 84/18* (2009.01)

(52) U.S. Cl.
CPC .......... *H04B 1/7156* (2013.01); *H04W 84/18* (2013.01)

(58) Field of Classification Search
CPC ... H04B 1/713; H04B 1/7156; H04L 12/1881; H04L 65/4076
See application file for complete search history.

(56) References Cited

U.S. PATENT DOCUMENTS

| | | | |
|---|---|---|---|
| 2014/0126610 A1* | 5/2014 | Hui ...................... | H04B 1/7156 375/134 |
| 2015/0188751 A1* | 7/2015 | Vasseur ............... | H04L 41/0613 709/224 |
| 2016/0150501 A1* | 5/2016 | Hui ...................... | H04B 1/7156 370/254 |
| 2018/0027588 A1 | 1/2018 | Vijayasankar et al. | |

FOREIGN PATENT DOCUMENTS

WO  2018/115854  6/2018

OTHER PUBLICATIONS

Combined Search and Examination Report for GB1812699.5, dated Feb. 1, 2019, 6 pages.

* cited by examiner

*Primary Examiner* — Kevin Kim
(74) *Attorney, Agent, or Firm* — Nixon & Vanderhye P.C.

(57) ABSTRACT

A technology is provided for operating a network-attachable electronic device, comprising attaching the electronic device to a frequency-hopping mesh network, the network having a synchronized broadcast channel schedule and an unsynchronized unicast channel schedule; deriving a common timing interval value of the network; establishing a subdivision of the derived common timing interval comprising alternating unicast transmit and receive slots based on a hierarchical position of the electronic device relative to a network root device; and at least one of transmitting and receiving at least one packet in a corresponding unicast transmit or receive slot with a one-hop network neighbour in a different hierarchical position relative to the network root device.

10 Claims, 7 Drawing Sheets

SYNCHRONIZING UNICAST TRAFFIC

This application claims priority to GB Patent Application No. 1812699.5 filed 3 Aug. 2018, the entire contents of which is hereby incorporated by reference.

The present technology relates to methods and apparatus for synchronizing unicast traffic in frequency-hopping mesh networks, especially low-power and lossy networks (LLNs), where packet transmission failures are commonplace. In such networks, excessive transmission retry activity can have a severely negative effect on system operations, not merely by increasing the latency of an individual message, but also by overloading the network, and by interfering with the statistics used in calculating network paths. These difficulties are exacerbated as networks increase in size.

In a first approach to the many difficulties encountered in unicast traffic handling in networks, the present technology provides a computer-implemented method for operating a network-attachable electronic device, comprising attaching the electronic device to a frequency-hopping mesh network, the network having a synchronized broadcast channel schedule and an unsynchronized unicast channel schedule; deriving a common timing interval value of the network; establishing a subdivision of the derived common timing interval comprising alternating unicast transmit and receive slots based on a hierarchical position of the electronic device relative to a network root device; and at least one of transmitting and receiving at least one packet in a corresponding unicast transmit or receive slot with a one-hop network neighbour in a different hierarchical position relative to the network root device.

In a hardware approach, there is provided electronic apparatus comprising logic elements operable to implement the methods of the present technology. In another approach, the computer-implemented method may be realised in the form of a computer program product.

Implementations of the disclosed technology will now be described, by way of example only, with reference to the accompanying drawings, in which.

The present technology thus provides computer-implemented techniques and logic apparatus for synchronizing unicast traffic in frequency-hopping mesh networks. In various implementations, networks having similar characteristics to frequency-hopping mesh networks may also be improved by application of the present technology.

Because of the power consumption economies that can be gained by exploiting the spreading of power consumption inherent in their hop-to-hop signal propagation methods, mesh networks are frequently implemented in low-power and lossy networks (LLNs). LLNs typically consist largely of constrained devices having limited processing power, memory, and sometimes energy, particularly when they are battery operated or energy-harvesting. These nodes are interconnected by lossy links, typically supporting only low data rates, that are typically unstable and may consequently have relatively low packet delivery rates.

LLNs are thus often advantageously arranged as mesh networks, in which attached devices may act both as leaf nodes performing operations and transmitting/receiving on their own behalf, and also as routers for other attached devices. A transmission in such a network thus normally proceeds in a hop-by-hop fashion from its source device to its target device or devices via one or more intermediate attached devices. Each of these single-hop transmissions is vulnerable to transmission failure, and one significant cause of such failures is that mesh networks are typically not centrally controlled and synchronized—thus a packet may be sent to a device over a channel to which that device is not listening at the moment the packet arrives, perhaps because the device is on a different channel, but often because the device is at the moment of packet arrival in transmission mode, rather than in receive mode.

Figure 1:
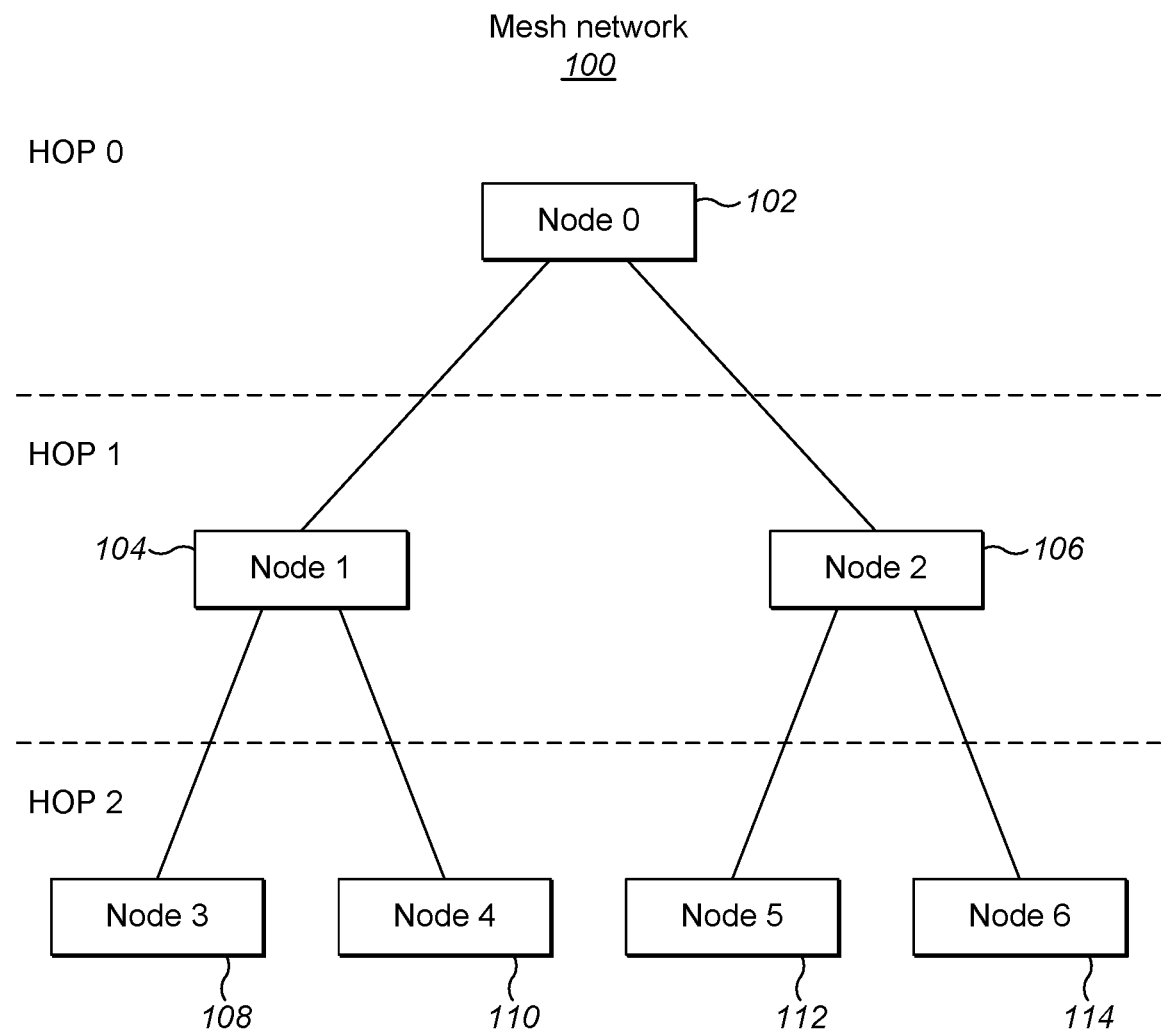
FIG. 1 shows a simplified view of some connections in a mesh network in which the presently described technology may be implemented.

Turning now to FIG. 1, there is shown a much simplified view of some connections in a mesh network such as a frequency-hopping mesh network (for example, one using using Routing Protocol for Low power and Lossy Networks (RPL). As described above, in such a network, packets are routed hop-by-hop from originator to destination. In FIG. 1, a portion of the mesh network 100 is shown, wherein Node 0 102 is an originating node at HOP 0 of a message, such as a packet, that may be transmitted in broadcast or unicast (point-to-point) fashion to other nodes in the mesh network, such as one-hop neighbours Node 1 104 and Node 2 106 at HOP 1 and two-hop neighbours Node 3 108, Node 4 110, Node 5 112, and Node 6 114. As will be clear to one of skill in the art, the portion of the mesh network 100 shown in FIG. 1 is limited to a binary tree of seven nodes, all connected in a parent-child hierarchy. In reality, each of the nodes of a mesh network may have a plurality of connections to one-hop neighbours, but for ease of understanding the presently disclosed technology, this compexity is not shown. Thus, in the Figure, all unicast traffic always goes downstream from a node to its next one-hop neighbour or child node or upstream to its previous one-hop neighbour or parent node. Depending on the network's configuration, there may also be other traffic—for example, traffic involved in finding a better parent. However, such unicast traffic to or routed via any node other than a node's next or previous one-hop-neighbour is out of scope of the present disclosure.

In FIG. 1, if node 0 102 wants to transmit a data to node 4 110, the data packet is send using node 1 104 as a router. If node 5 112 wants to send data to node 0 102, it is send using node 2 106 as a router. In addition to unicast traffic, there is also broadcast traffic which means that data has no destination address and it is intended for all listening nodes in the network. Thus, in FIG. 1, when node 0 102 sends a broadcast packet, if nodes 1, 2, 3, 4 and 5 are in listening mode, they will receive the packet.

For example, in a Wi-SUN® frequency hopping spread spectrum (FHSS) network, all nodes in a network have a synchronized broadcast channel schedule and individual unsynchronized unicast channel schedules. To transmit broadcast data, the originator just sends it on its broadcast channel and any node in range can receive it. Thus, if node 0 102 sends a broadcast packet on its scheduled broadcast channel 0, because the broadcast schedule is synchronized, all the nodes are listening on channel 0 and can receive the packet. Similarly, if node 3 108 sends a broadcast packet on its scheduled broadcast channel 1, all other devices can receive it. By contrast, to transmit unicast data, the originator has to determine the next/previous hop router node unicast channel schedule to know on which channel it is listening for packets at that moment and transmit data on that channel. Determining the unicast channel schedule of a neighbour node is typically achieved by using a neighbour table, in which each one-hop neighbour's channel schedule is recorded. However, because the unicast schedules of the nodes are not synchronised, the same simplicity of function does not apply to unicast transmissions as to broadcast tramsissions, and thus the arrangements of the presently disclosed technology are required to address this issue.

Figure 2:
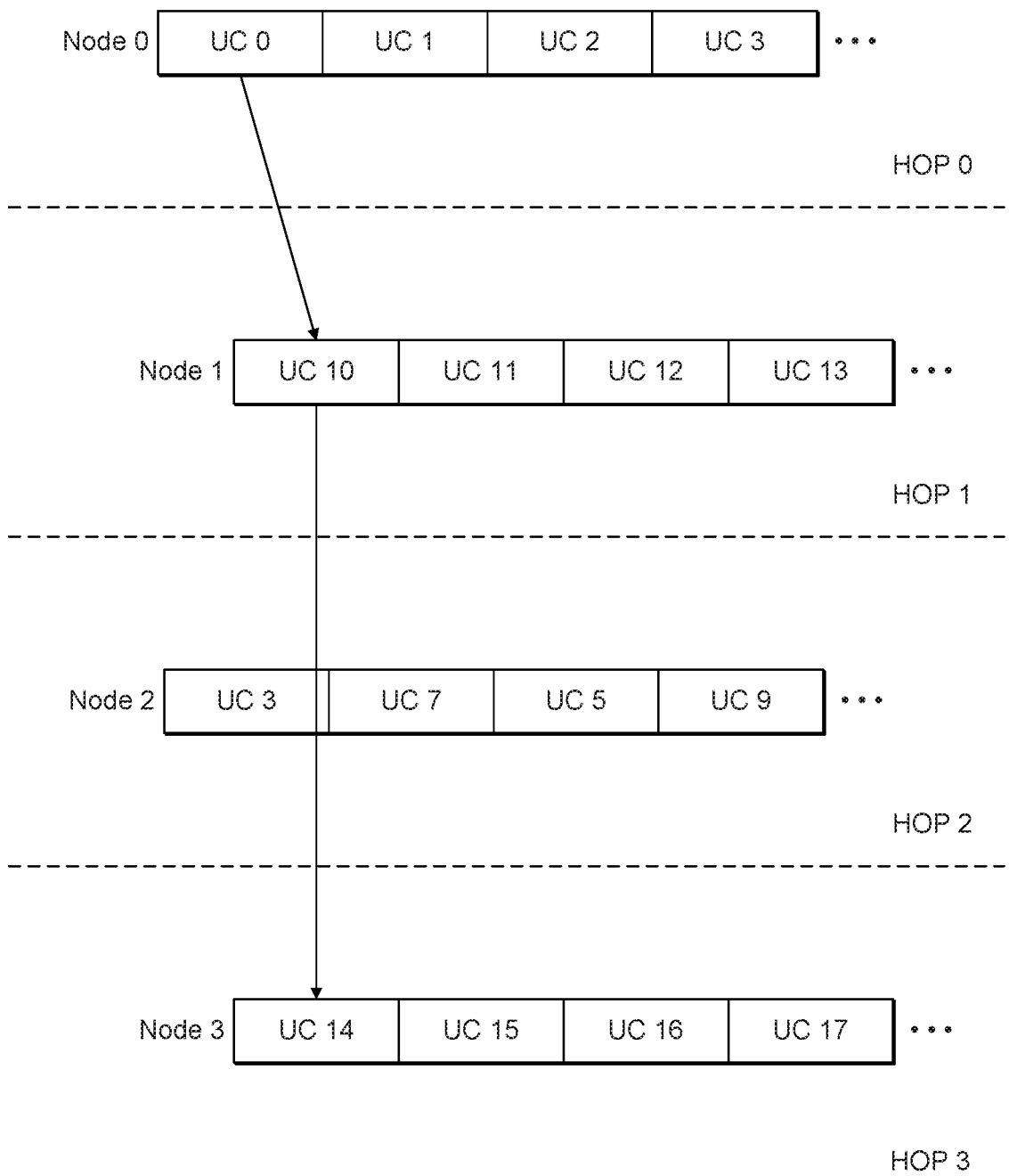
FIG. 2 shows a first worked example of the operation of a mesh network.

FIG. 2 shows a first worked example 200 of the operation of a simplified mesh network comprising four nodes—Node 0, Node 1, Node 2 and Node 3 in a hop-wise hierarchy of nodes. As is clear from the figure, each node has a frequency-hopping schedule, which it publishes to the network, so that other nodes are made aware of the channel on which each node is operating at any moment. However, there is no indication whether any node is transmitting or receiving on any channel at any moment. In FIG. 2, Node 0 (hop 0) wants to transmit unicast data to Node 3 (hop 3) and it has to use Node 1 (hop 1) as a router. Node 0 calculates the unicast channel schedule of Node 1 from its published frequency-hopping schedule. Now Node 0 knows that Node 1 is currently scheduled to be on channel 10 and transmits the packet there. Node 1 routes the packet to Node 3 by looking up the Node 3 channel schedule and transmits to Node 3 using channel 14.

As shown in FIG. 2, a successful transmission passes from an originating node to a destination node, if necessary via one or more intermediate nodes that route the packet onwards in a hop-wise fashion. All is well if each node is in receive state when a packet arrives, and can then switch into transmit state to forward the packet if it is not the intended destination node. However, when a node switches to transmit state to send a packet on to another node's listening channel, it is unable to receive anything on its own listening channel, and this means that packets may be lost and require retransmission, which causes scalability issues, limiting the size of the network that can be implemented.

Figure 3:
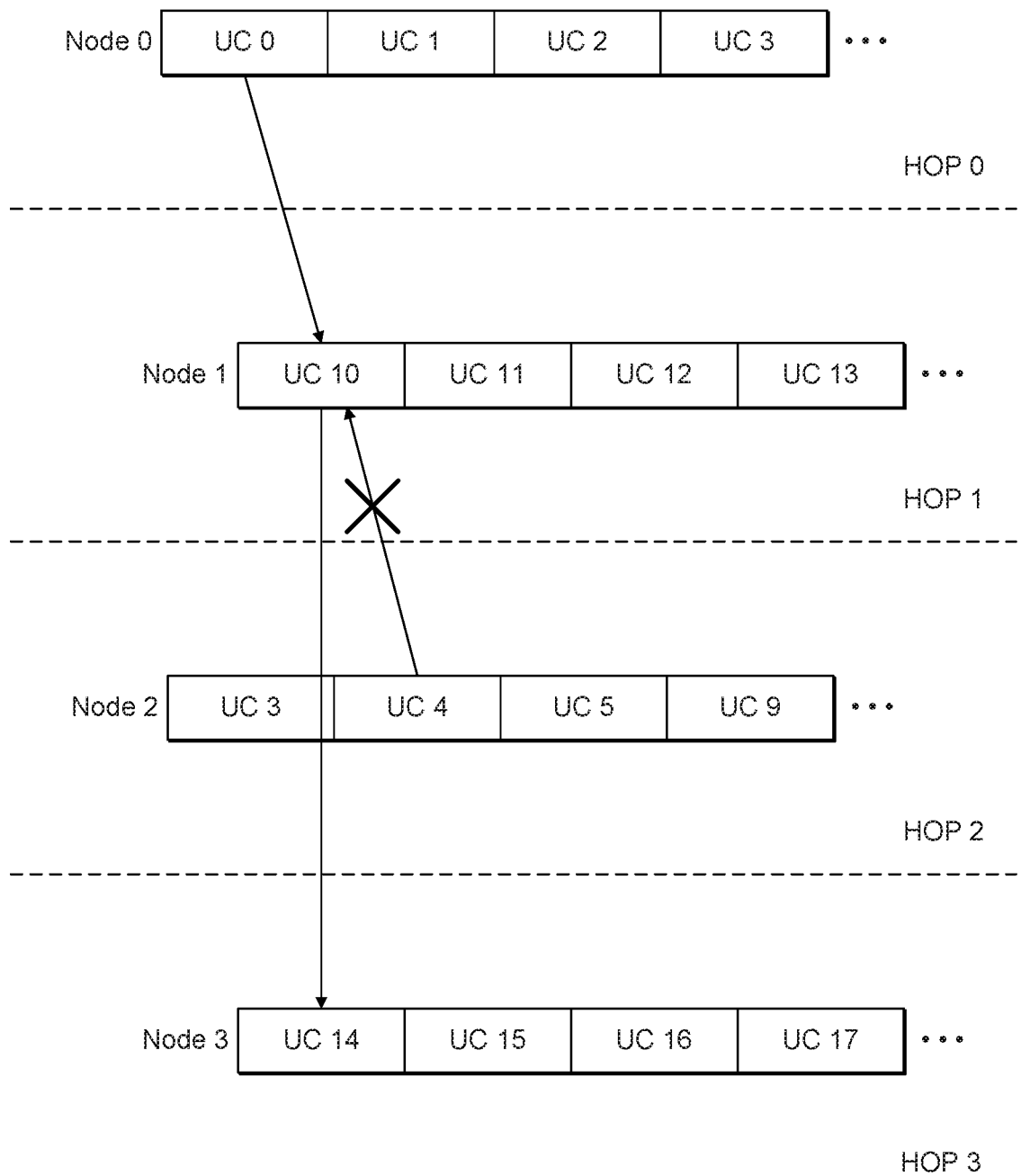
FIG. 3 shows a second worked example of the operation of a mesh network demonstrating one instance of a transmission failure.

For instance, in the worked example 300 of FIG. 3, node 2 (at hop 2) tries to transmit a packet to node 1 (at hop 1) on channel 10 when node 1 has just exited receive mode on channel 10 after receiving a packet from node 0 and switching to transmit mode to forward the packet to node 3 (at hop 3) on channel 14. The transmission from node 2 is lost because node 1 is in transmit mode on channel 10 rather than receive mode. Thus, even though the channel schedule of a node is known to its neighbouring nodes, transmissions can be lost because the destination node is not in receive mode.

Figure 4:
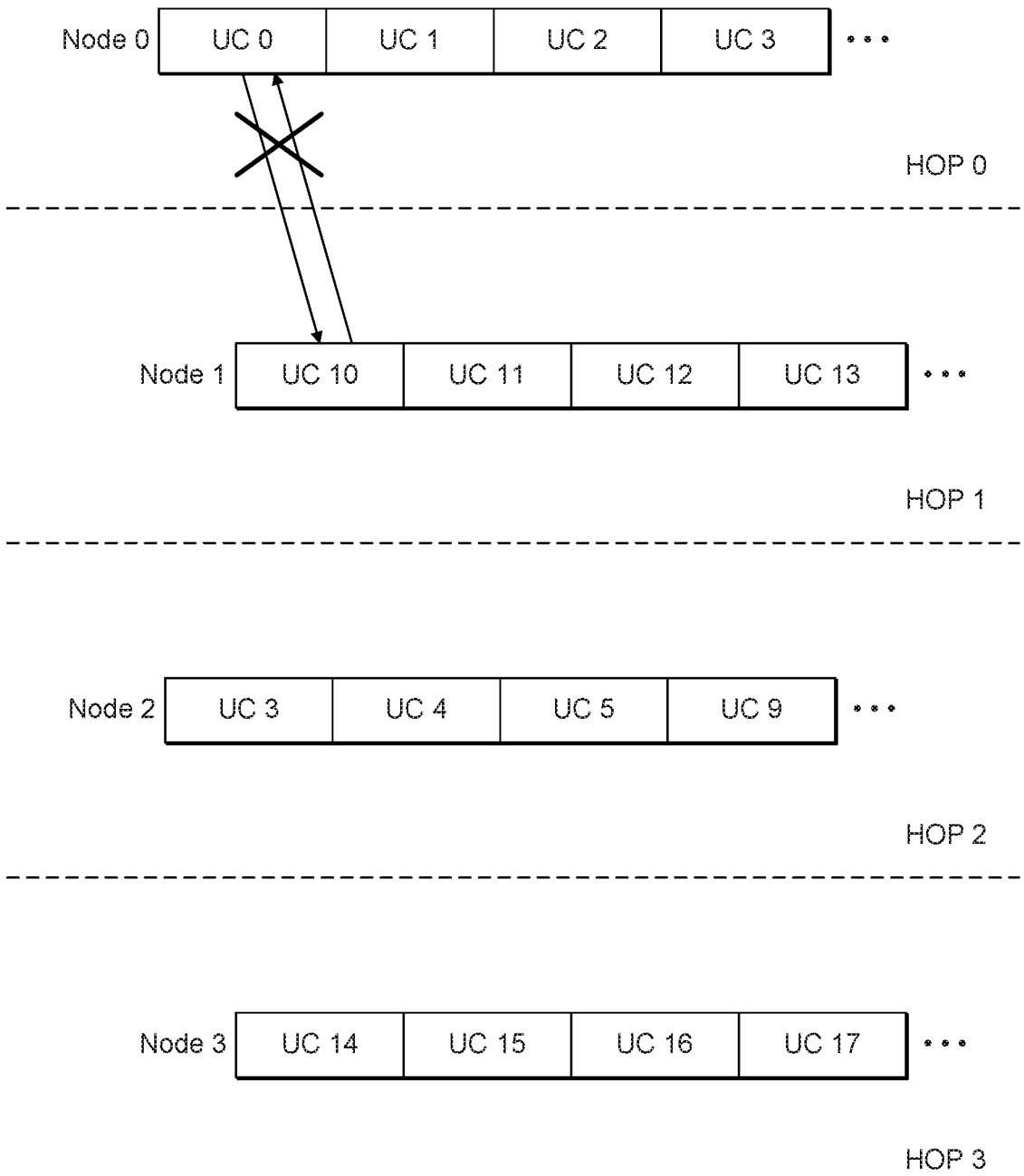
FIG. 4 shows a third worked example of the operation of a mesh network demonstrating a further instance of a transmission failure.

In a further worked example 400 shown in FIG. 4, node 0 (at hop 0) is transmitting a packet to node 1 (hop 1) on channel 10 and simultaneously node 1 is transmitting a packet to node 0 (at hop 0) on channel 0. Both packets are lost because node 0 has switched to transmit mode to send a packet to node 1 and node 1 has switched to transmit mode to send a packet to node 0.

To alleviate these difficulties, a common timing interval is derived from the network (in implementations, the common timing interval is derived from the network-wide broadcast schedule) and subdivided into alternating unicast transmit and receive slots based on a hop-wise hierarchical position of the device relative to a network root device, for example by means of the known Rank parameter of the RPL protocol, where the hierarchy is established by hop count from a network root device. The nodes are thus enabled to transmit and receive packets in corresponding unicast transmit or receive slots with their one-hop network neighbours, whereby the hop-by-hop alternation of transmit and receive slots between one-hop neighbours reduces the chance of a neighbour being in transmit mode when it should be receiving and vice versa. The number of unicast transmit and receive slots may be determined for each implementation based on a balance between too few slots causing greater latency and too many slots causing too rapid an alternation between transmit and receive and thus engendering timing errors.

Figure 5:
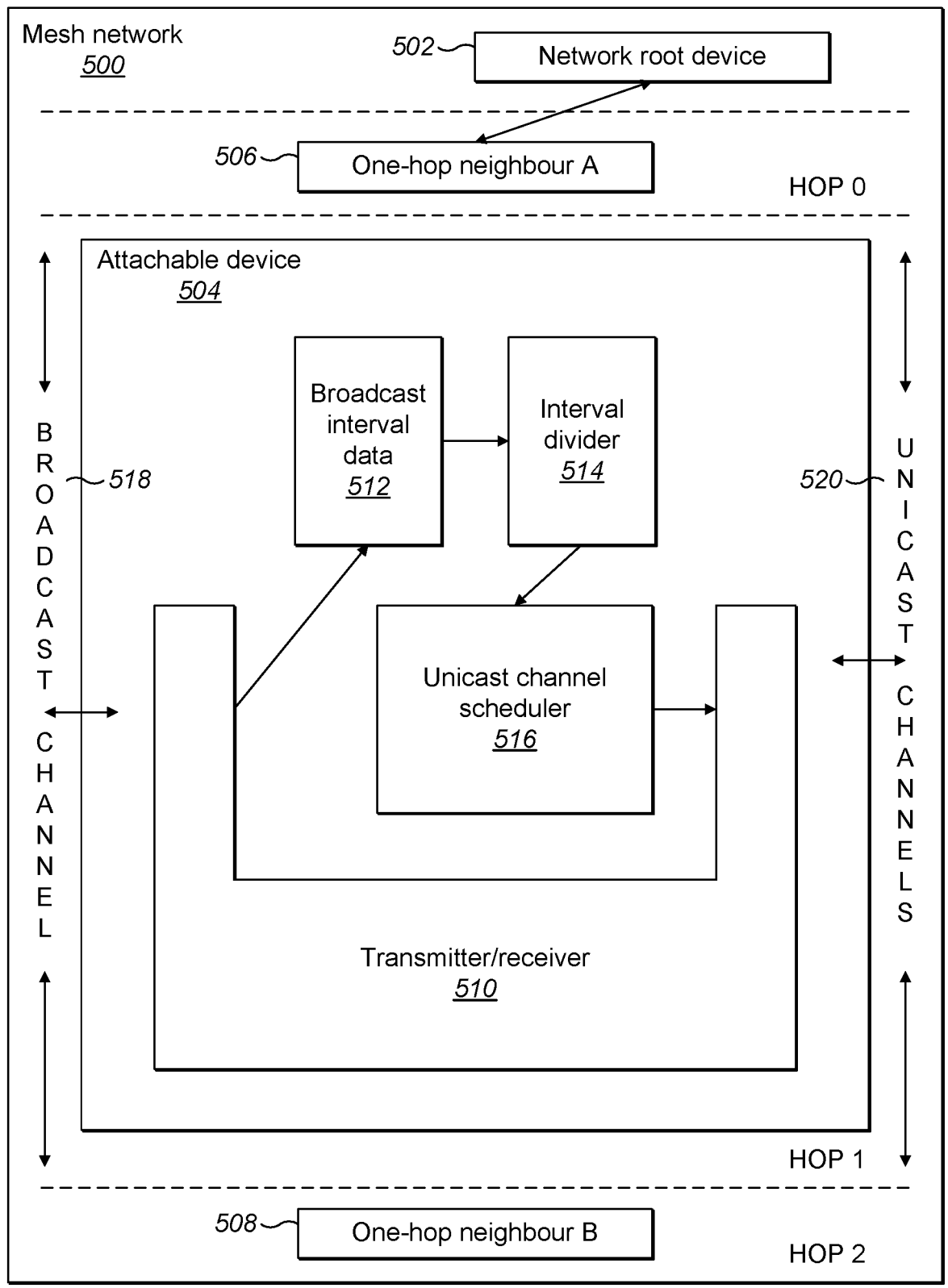
FIG. 5 shows a block diagram of an arrangement of logic, firmware or software components by means of which the presently described technology may be implemented.

Turning now to FIG. 5, there is shown a block diagram of an exemplary processing arrangement comprising logic components, firmware components or software components by means of which the presently described technology may be implemented. FIG. 5 shows a mesh network 500 having a network root device 502, and in which attachable device 504 forms one node connected to its nearest one-hop neighbours, one-hop neighbour A 506 and one-hop neighbour B 508 by means of broadcast channel 518 and unicast channels 520. Attachable device 504 lies at Hop 1, and its parent, one-hop neighbour A 506, lies at Hop 0. Attachable device 504 is also connected to its child, one-hop neighbour B 508, which lies at Hop 2. Attachable device 504, its neighbours 506 and 508, and network root device 502 may comprise any devices suitable to be operated as part of the network, such as mobile (cellular) telephone devices, client or server computing devices, wearable tracker devices, intelligent routing devices and the like.

Attachable device 504 communicates over broadcast channel 518 and unicast channels 520 using one or more components forming a transmitter/receiver 510. In embodiments, broadcast interval data 512 may be acquired from broadcast channel 518 using transmitter/receiver 510, and passed to interval divider 514, which is operable to divide a broadcast interval into sub-intervals and to provide sub-interval data to unicast channel scheduler 516. In embodiments, unicast channel scheduler 516 is operable to control alternating transmit and receive intervals for unicast traffic, respectively from and to attachable device 504. The various methods of operation of these network components will be described in detail below.

Figure 6:
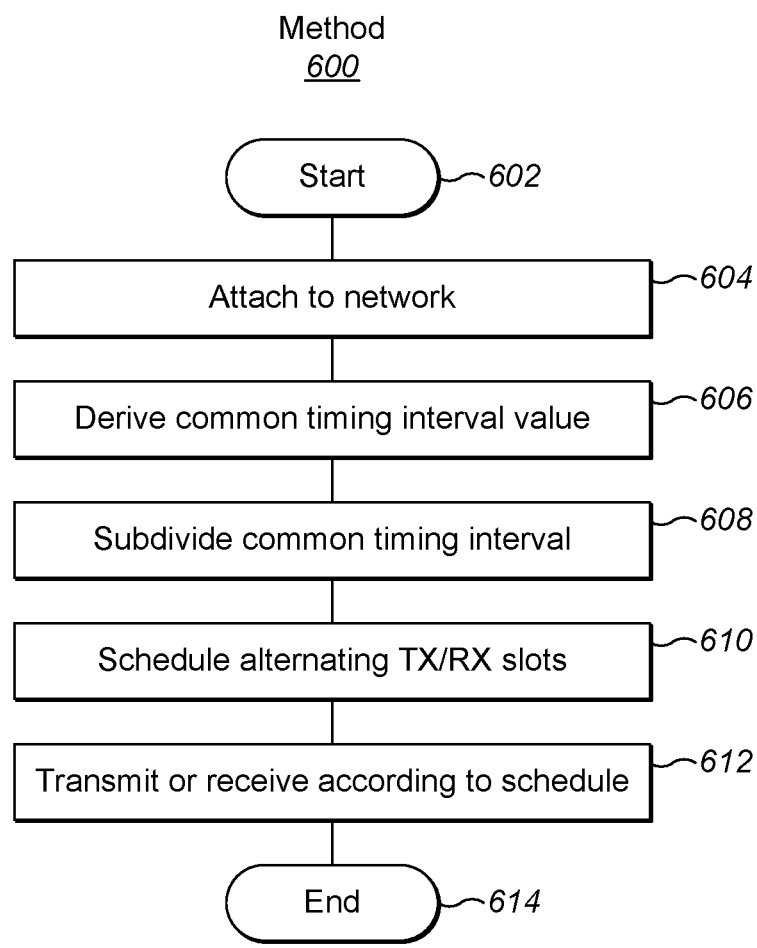
FIG. 6 shows one example of a method of operating a mesh network according to an implementation of the presently described technology.

Turning now to FIG. 6, there is shown one method 600 by which an attachable device 504 as shown in FIG. 5 may achieve synchronization of unicast traffic. The method starts at Start step 602, and at 604, an attachable device (such as attachable device 504 of FIG. 5) attaches to a mesh network (such as mesh network 500 of FIG. 5). At 606, the attachable device 504 derives a common timing interval value from information received from the mesh network 500. In implementations, the common timing interval value is derived from a synchronized broadcast interval value, which may be either known to attachable device 504 or may be received in the form of a transmission from another device attached to the mesh network 500. At 608, the attachable device 504 subdivides the common timing interval into sub-intervals, and at 610, schedules alternating transmit and received slots based on the sub-intervals, such that each sub-interval is either a transmit slot or a receive slot. In implementations, the attachable device 504 has information relating to the transmit and receive slots of its parent, and is operable to schedule its alternating transmit and receive slots inversely relative to those of its parent—thus, when the parent of attachable device 504 (one-hop neighbour A 506 of FIG. 5) is in transmit mode according to its schedule, attachable device 504 is in receive mode, and vice versa.

As the same technique is applied over the mesh network, each parent and child relationship follows the same pattern, such that in each sub-interval of the common timing interval, each device is in the opposite mode from its parent and its child. In implementations, the alternation of transmit and receive modes over the mesh network may be propagated outward from a network root device (such as network root device 502 of FIG. 5). Attachable device now has its transmit and receive schedule set for unicasts, and at 612, it is operable to transmit or receive according to the schedule. At end step 614, the method completes.

In this way, according to impementations of the present technology, a synchronized broadcast schedule can be used to provide a baseline "heartbeat" interval enabling the nodes to divide the time into broadcast traffic periods and unicast traffic periods; the unicast traffic periods in turn are divided into transmit (TX) and receive (RX) slots and these slots are arranged to alternate with respect to those of their nearest neighbours. In this way, when a node on hop X is in a TX slot, the previous hop (X−1) and next hop (X+1) nodes are always in RX slots and therefore the transmissions to and from the previous or next hop neighbours can never collide. With the need for retransmissions reduced in this way, there is a reduction in overall network traffic and thus larger networks can be supported.

Figure 7:
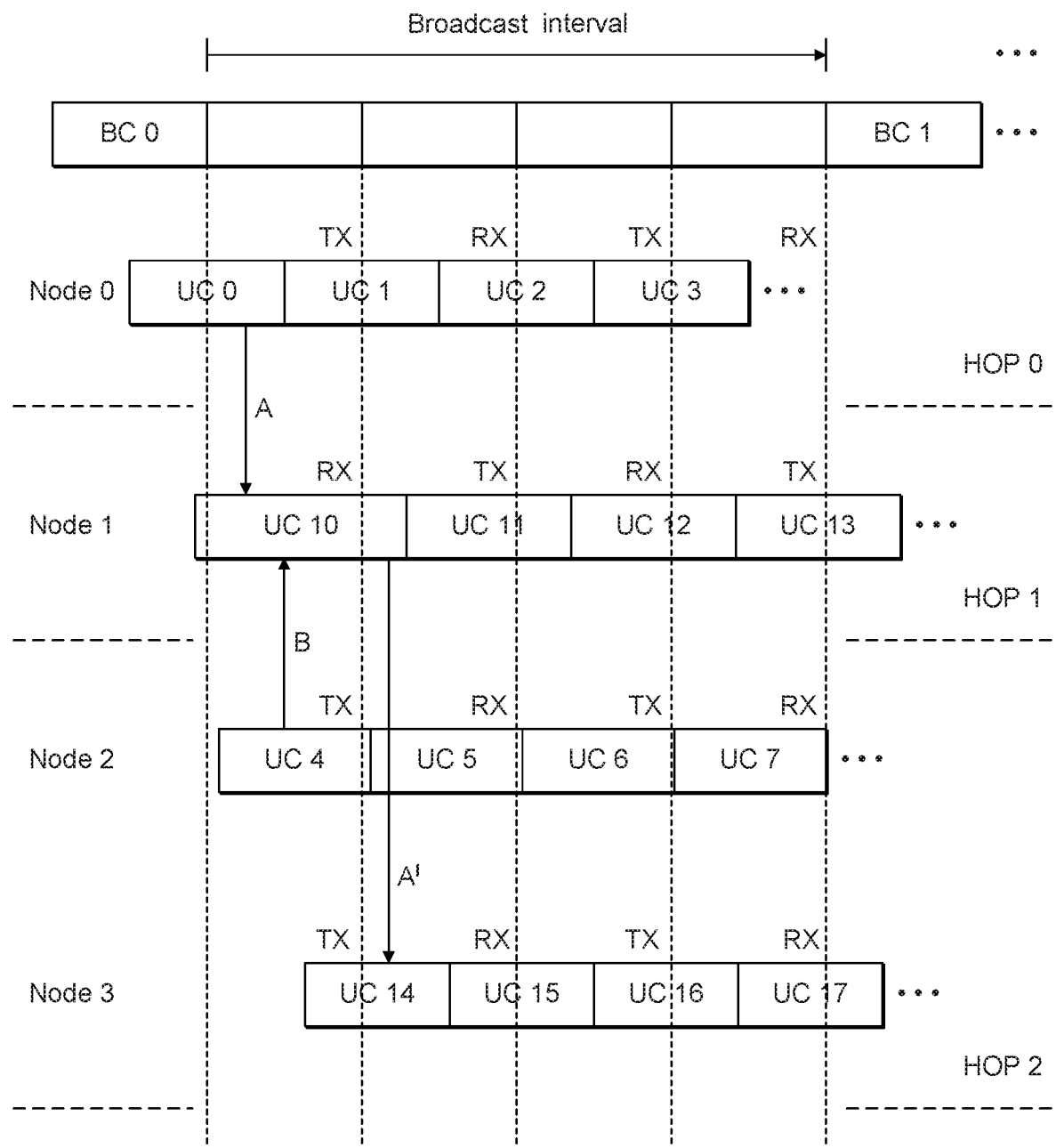
FIG. 7 shows a fourth worked example of the operation of a mesh network demonstrating an implementation of the present technology.

FIG. 7 shows an example of the operation of a network according to an embodiment of the present technology. As shown at the top of the figure, the broadcast intervals set across the network provide a "heartbeat", or a common timing interval that can be detected by each node of the network. The broadcast intervals consist firstly of the actual broadcast channel slots (BC0, BC1, . . . ) during which the broadcast communications may be sent and received. During the broadcast slots (BC0, BC1, . . . ), nodes are operable to send and receive broadcast communications. The broadcast intervals further consist of slots that are not needed to accommodate broadcast channels (shown in the figure as the empty slots between BC 0 and BC 1. It is the divisions between broadcast slots and "empty" slots (shown in the figure as dotted vertical lines) that provide the sub-interval "heartbeat" that is used by the network nodes to synchronize the unicast communications according to the present technology. The time thus made available for unicast communications is divided into transmit (TX) and receive (RX) slots and the slots are set to alternate on every hop, such that, for example, when node 1 is set to receive (RX), its parent and child one-hop neighbours (respectively node 0 at hop 0 and nodes 2 and 3 at hop 2) are set to transmit (TX) and vice versa.

In FIG. 7, node 0 (at hop 0) wants to transmit data to node 3 (at hop 2) and it has to use node 1 (at hop 1) as a router. Node 0 is in transmit (TX) mode and it looks up the unicast channel schedule of node 1. Now it knows that node 1 is currently on channel 10 and that, as it is a one-hop neighbour of node 0, which is in transmit (TX) mode, it will be in receive (RX) mode, and so it transmits the packet at transmission A. Node 1 receives the packet during its receive (RX) slot and then routes it to node 3 by waiting until its own transmit (TX) slot starts, looking up the node 3 channel schedule and transmitting on node 3 channel 14 at transmission A'. Meanwhile, node 2 (also at hop 2, and thus also a one-hop neighbour of node 1) is able to transmit a packet at transmission B to node 1 on channel 10 because node 1 remains in its listening channel while it is in receive (RX) mode.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

Furthermore, the present technique may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present technique.

The invention claimed is:

1. A computer-implemented method for operating a network-attachable electronic device, comprising:
   attaching said electronic device to a frequency-hopping mesh network, said network having a synchronized broadcast channel schedule and an unsynchronized unicast channel schedule;
   deriving a common timing interval value of said network;
   establishing a subdivision of said derived common timing interval comprising alternating unicast transmit and receive slots based on a hierarchical position of said electronic device relative to a network root device; and
   at least one of transmitting and receiving at least one packet in a corresponding unicast transmit or receive slot with a one-hop network neighbour in a different hierarchical position relative to said network root device.

2. The computer-implemented method according to claim 1, further comprising, responsive to said electronic device being in a unicast receive slot, delaying transmission by said electronic device until at least a start time of a subsequent unicast transmit slot.

3. The computer-implemented method according claim 1, said hierarchical position being determined by a hop count of said electronic device from said network root device.

4. The computer-implemented method according to claim 3, said network root device comprising a border router.

5. The computer-implemented method according to claim 1, said hierarchical position being determined by a Routing Protocol for Low power and Lossy Networks (RPL) rank of said electronic device.

6. The computer-implemented method according to claim 1, wherein said attaching said electronic device to a frequency-hopping mesh network comprises attaching said electronic device to a network, and wherein all nodes in the network have a synchronized broadcast channel schedule and individual unsynchronized unicast channel schedules.

7. The computer-implemented method according to claim 1, wherein said deriving a common timing interval value of said network comprises determining a broadcast interval of said frequency-hopping mesh network.

8. The computer-implemented method according to claim 1, wherein said subdivision of said common timing interval comprises at least one sub-interval divisible into at least one broadcast slot and at least one said unicast slot.

9. An electronic device comprising:
   attachment logic operable to attach said electronic device to a frequency-hopping mesh network, said network having a synchronized broadcast channel schedule and an unsynchronized unicast channel schedule;
   timing logic operable to derive a common timing interval value of said network;
   divider logic operable to establish a subdivision of said derived common timing interval comprising alternating unicast transmit and receive slots based on a hierarchical position of said electronic device relative to a network root device; and
   transceiver logic operable to perform at least one of transmitting and receiving at least one packet in a corresponding unicast transmit or receive slot with a one-hop network neighbour in a different hierarchical position relative to said network root device.

10. A non-transitory, computer-readable storage medium storing computer program code operable, when loaded into a computer and executed thereon, to cause said computer to operate logic circuitry to perform the steps of the method of claim 1.

* * * * *